United States Patent
Parker

(12) 
(10) Patent No.: US 6,502,709 B1
(45) Date of Patent: Jan. 7, 2003

(54) APPARATUS FOR TARPING FLATBED TRAILERS

(75) Inventor: Mitchell B. Parker, Florence, SC (US)

(73) Assignee: Aluminum Ladder Company, Florence, SC (US)

( * ) Notice: Subject to any disclaimer, the term of this patent is extended or adjusted under 35 U.S.C. 154(b) by 64 days.

(21) Appl. No.: 09/638,187

(22) Filed: Aug. 14, 2000

(51) Int. Cl.⁷ .................................................. B60P 7/04
(52) U.S. Cl. ........................ 212/328; 212/271; 296/98
(58) Field of Search ................................ 212/166, 315, 212/71, 328, 271; 105/377.01, 377.02, 377.03, 377.04; 29/98, 100, 101; 296/98

(56) References Cited

U.S. PATENT DOCUMENTS

| | | | |
|---|---|---|---|
| 2,070,586 A | | 2/1937 | Fitch |
| 2,226,699 A | * | 12/1940 | Dietrichson ................ 212/166 |
| 3,994,240 A | | 11/1976 | Berg et al. |
| 4,050,734 A | | 9/1977 | Richard |
| 4,259,787 A | * | 4/1981 | Minshall et al. ............... 34/201 |
| 4,705,180 A | * | 11/1987 | Lamer et al. ................ 212/166 |
| 4,776,429 A | * | 10/1988 | Osborn ........................ 182/147 |
| 4,927,317 A | * | 5/1990 | Acosta ........................ 414/724 |
| 5,036,775 A | | 8/1991 | Snead |
| 5,054,402 A | | 10/1991 | Brassell |
| 5,320,121 A | * | 6/1994 | Alexanian .................... 134/123 |
| 5,402,732 A | * | 4/1995 | Erickson et al. ............. 105/359 |
| 5,682,823 A | | 11/1997 | Tihansky et al. |
| 6,373,401 B2 | * | 8/2001 | Payne ........................ 254/266 |

FOREIGN PATENT DOCUMENTS

JP        7-144573     *   6/1995

* cited by examiner

*Primary Examiner*—Thomas J. Brahan
(74) *Attorney, Agent, or Firm*—Charles L. Schwab; Nexsen Pruet Jacobs & Pollard, LLC

(57) ABSTRACT

A drive-through work station with power operated tarping equipment is provided to efficiently and safely apply tarpaulin covers to payloads on flatbed highway trailers. The work station may include a work platform at one or both sides of the trailer being tarped.

9 Claims, 7 Drawing Sheets

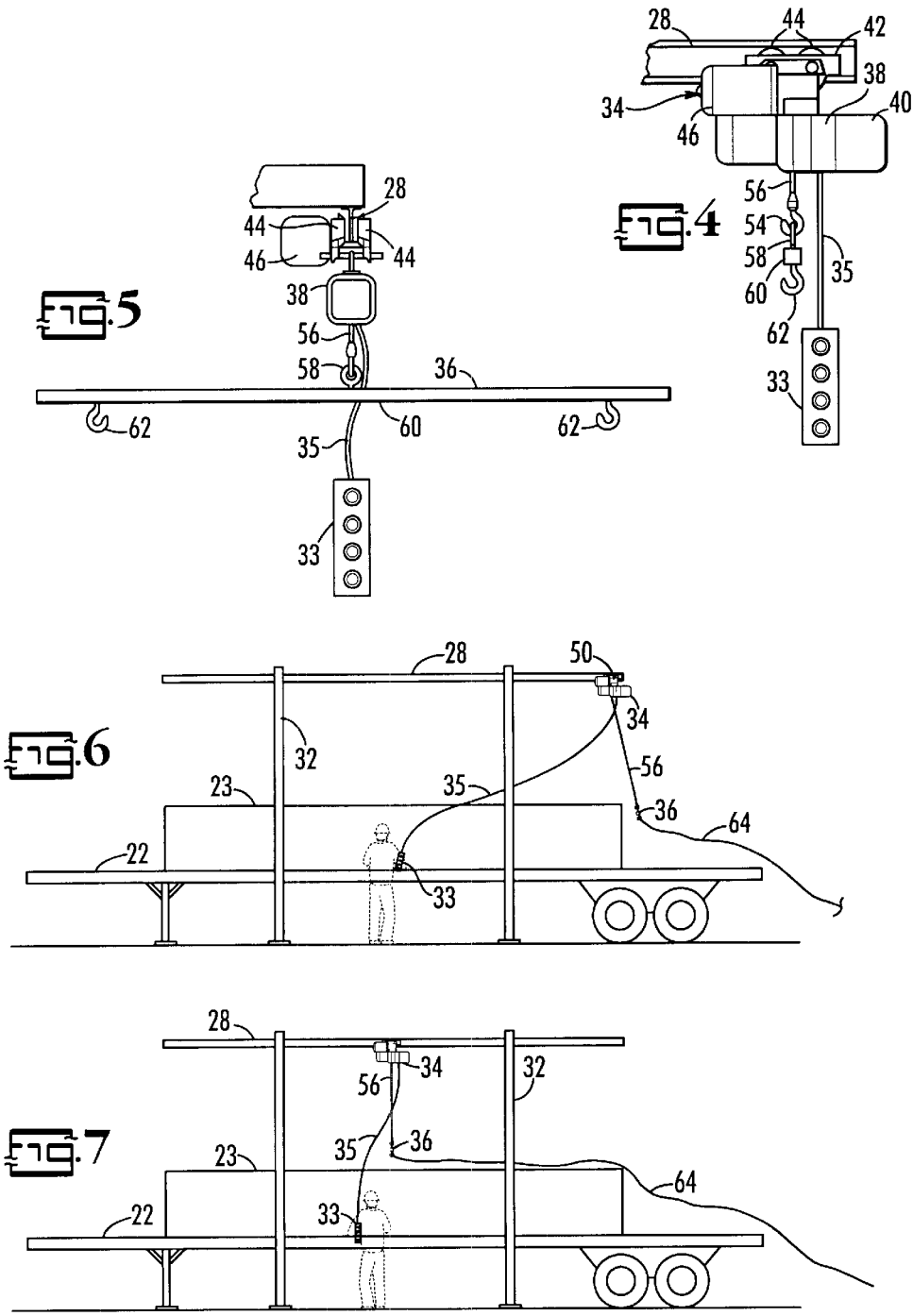

APPARATUS FOR TARPING FLATBED TRAILERS

TECHNICAL FIELD

This invention relates to placement of a tarpaulin cover over a payload on a flatbed trailer of the type towed on highways by an appropriately equipped tow truck or tractor.

BACKGROUND OF THE INVENTION

Many payloads transported on flatbed trailers need to be covered to protect the load from the sun, dust, rain, sleet, snow and the like. Heretofore it has been a common practice to protect vulnerable payloads with a large tarpaulin cover which is relatively heavy. Because of the weight of the tarpaulin cover, the services of several workmen are needed to lift and place the cover on the payload. Typical trailer tarping operations are labor intensive and time-consuming.

INFORMATION DISCLOSURE STATEMENT

Flatbed trailers are typically "tarped" by a substantial number of workmen lifting and tugging a heavy tarpaulin cover over the payload on the flatbed trailer. The tarpaulin cover is heavy and thus requires a considerable number of workmen. The proper number of workman are not always available at the time needed and thus time is wasted waiting for the required number. At some locations workmen are drawn from other work projects, thus causing undesirable interruptions in those projects. Manually moving the tarpaulin cover into a cargo covering position on a flatbed trailer is a difficult job requiring considerable strength and not all workmen are capable of such work or agreeable to engage in such work.

Heretofore others have provided protective covers for various cargo carrying vehicles. U.S. Pat. No. 2,070,586, issued on Feb. 16, 1937 to B. F. Fitch on a Freight container, discloses a freight container having a roof of corrugated metal sheets which may be lifted by a hoist hook.

U.S. Pat. No. 3,994,240, issued Nov. 30, 1976, to R. L. Berg et al. on a Coil Car Cover, describes a light weight removable cover for railroad coil cars which is made of fiberglass reinforced plastic and which includes a lifting cage engageable by the lift hook of a crane.

U.S. Pat. No. 4,050,734 issued Sep. 27, 1977 to D. B. Richard on a Roll-up Truck Cover Assembly, shows a flexible top cover for a dump truck. The flexible cover is wound up on a spring biased take-up roll carried on support arms pivoted by fluid operated cylinders.

U.S. Pat. No. 5,036,775, issued Aug. 6, 1991, to E. D. Snead on a Covered Gondola Car, shows gondola cars covered by rigid covers made of fiberglass which can be removed by a tractor-shovel.

U.S. Pat. No. 5,054,402 issued Oct. 8, 1991, to G. W. Brassell on a Removable Cover for Gondola Cars with Lightweight Composite Panel Construction, discloses removable cover panels having a plastic foam core sandwiched between metal sheets. The cover is removable by connecting a hoist hood to a lift line.

U.S. Pat. No. 5,682,823, issued Nov. 4, 1997, to E. L. Tihansky et al. on a Removable Insulated Cover and Method of Transporting Hot Oversized Steel Ingots, shows a rigid protective housing for a ingot placed on a railroad car by a lifting device.

OBJECTS AND SUMMARY OF THE INVENTION

It is a primary object of this invention to provide a drive-through work station for efficiently installing a tarpaulin cover to a payload on a flatbed highway trailer It is a further object to provide a work station for installing a tarpaulin cover to a flatbed highway trailer which required less manpower than heretofore required. Another object of this invention is the provision of a work station to install a tarpaulin cover to the payload on a flatbed trailer in less time than heretofore required. A further object of the invention is to enhance worker safety, as for instance, by decreasing the chance of workers falling off the trailer during a tarping operation and by providing safe worker movement to and from the flatbed trailer.

The work station of the present invention utilizes a power operated traveling hoist for lifting and moving a tarpaulin cover to its cargo covering position with minimal manpower and in much less time than previously required.

In a preferred embodiment of the invention, one end of the tarpaulin cover is releaseably attached to a hanger on the end of a hoist line or chain of a power operated winch. The power operated winch is mounted on a wheeled carriage supported on an overhead track running lengthwise above the trailer. After the tarpaulin end is raised by the power winch, the carriage is power driven along the support track thereby pulling the tarpaulin cover over the payload on the trailer The towed end of the tarpaulin cover is lowered and disconnected from the hanger. Then the tarpaulin cover is secured to the trailer.

In order to facilitate the operation of the work station a walkway or work platform is preferably provided at one or both lateral sides of the trailer. The work platform may be at the height of the flatbed trailer for trailers transporting loads of low elevation, or it may be at an elevated height for trailers carrying high loads. The work performed affords safe movement of workers to and from the flatbed trailers, and positions for handling and fastening the tarpaulin to the trailer or the cargo.

BRIEF DESCRIPTION OF THE DRAWINGS

Various embodiments of the invention are illustrated by the drawings, in which:

FIG. 4 is a side view showing the traveling hoist of the work station;

FIG. 5 is an end view of the traveling hoist shown in FIG. 4;

FIG. 6 is a side view of the work station showing the winch line lowered and a hanger connected to a tarpaulin cover;

FIG. 7 is a side view of the work station showing the tarpaulin cover being moved lengthwise over the payload on the trailer;

DETAILED DESCRIPTION OF THE INVENTION

Figure 1:
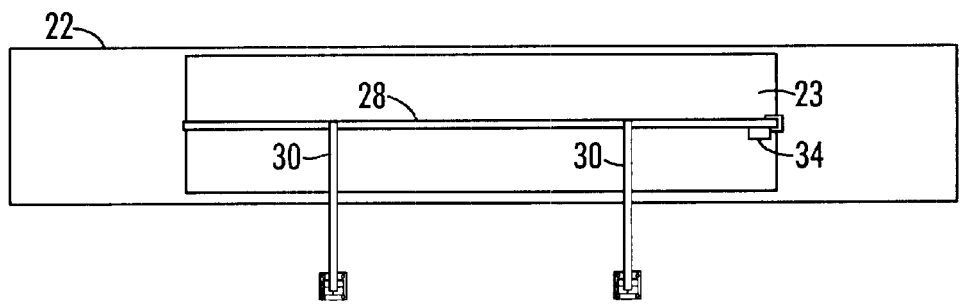
FIG. 1 is a top view of a trailer tarping work station.
Figure 2:
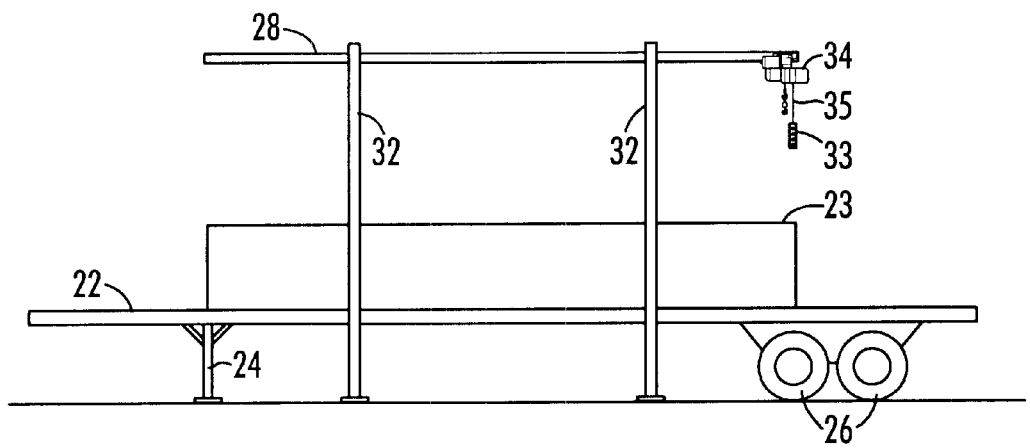
FIG. 2 is a side view of the work station shown in FIG. 1.
Figure 3:
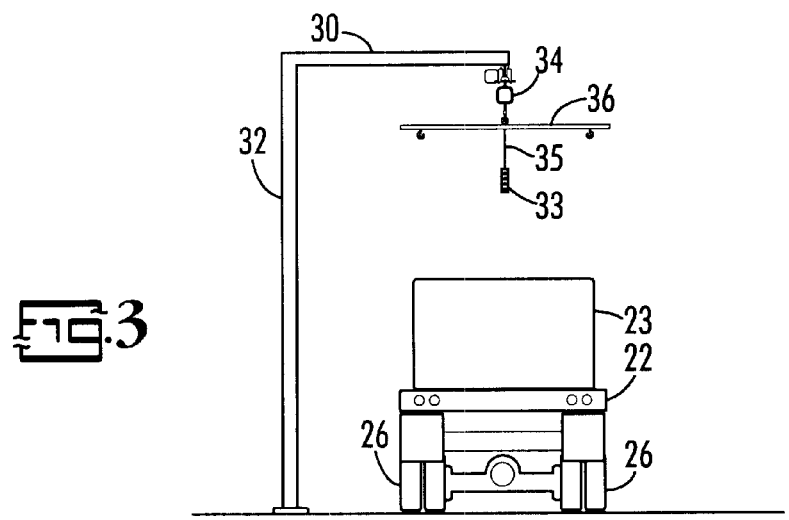
FIG. 3 is an end view of the work station shown in FIG. 2.

Referring to FIGS. 1, 2 and 3, a flatbed trailer 22 with a payload 23 has been disconnected from its towing tractor. The front end of the trailer is supported on a swingdown support 24 and the rear of the trailer is supported by its tandem wheels 26. The trailer 22 is parked at a tarping work station which includes an overhead track 28 in the form on a wide flange I beam, or H beam. The track 28 is rigidly secured to parallel support arms 30 extending horizontally from the top of a pair of vertical support poles 32 spaced from one another in the longitudinal direction of the trailer 22. The support poles 22 include pads at their bottoms which are rigidly bolted to studs extending upwardly from buried concrete bases. A traveling hoist 34, such as a commercially available hoist model YEL 1/4-MT 16S1 sold by YALE of Forest City, Ark., is mounted on the overhead track 28 and includes a winch 38 supporting a tarpaulin hanger 36.

The travel of the hoist 34 on the track 28 and the raising and lowering of the tarpaulin hanger 36 is controlled by a push button controller 33 on the end of are tractable electric cable 35. Although the trailer (22) is shown disconnected from its tow tractor, the work station is designed as a drive-through facility and in normal operation the tow tractor is not disconnected from the trailer and the truck and trailer remain at the station only long enough for tarping of the trailer.

Referring to FIGS. 4 and 5, the traveling hoist 34 includes the winch 38 powered by a reversible electric motor 40. The winch 38 is supported on a traveling carriage 42 having a pair of drive wheels 44 at each of the opposite lateral sides of the web of the track 28, the wheels 44 engaging the top sides of the bottom flanges of the I beam track 28. The wheels 44 of the carriage are driven by a reversible electric motor 46 to move the traveling hoist along the track 28. The electric winch 38 includes a hoist line 56 with a hoist hook 56 connected to an eye 58 on the tarpaulin hanger 36. The hanger 36 has a pair of spaced hooks 62 on a cross rod 60 which are adapted for releasable connection to tarpaulin covers.

Referring to FIG. 6, the winch cable has been lowered and the hooks 62 of the hanger 36 are connected to one longitudinal end of a tarpaulin cover 64. The winch has raised and pulled the tarpaulin to near the rear end of the payload 23. FIG. 7 shows the tarpaulin end raised above the payload 23 and the traveling hoist (34) has been power driven to a mid position relative to the payload 23 on the trailer 22. The tarpaulin cover 64 has been moved forward to cover about one half of the payload 23. To complete the covering operation, carriage 42 will be driven forward on the track 28 to bring the tarpaulin cover 64 end to near the front end of the payload 23. The tarpaulin cover 64 is then disconnected from the hanger 36 and workmen secure the cover to the trailer 22 and/or the payload 23.

Electric power is supplied to the electric motors 40, 46 by sliding contact rails, not shown, carried by the track 28. The reversible electric motors 40, 46 are controlled by the hand held controller 33 which has manually operated push buttons for fore and aft travel of the hoist 34 and raising and lowering of hoist line 56 and hanger 36.

Figure 8:
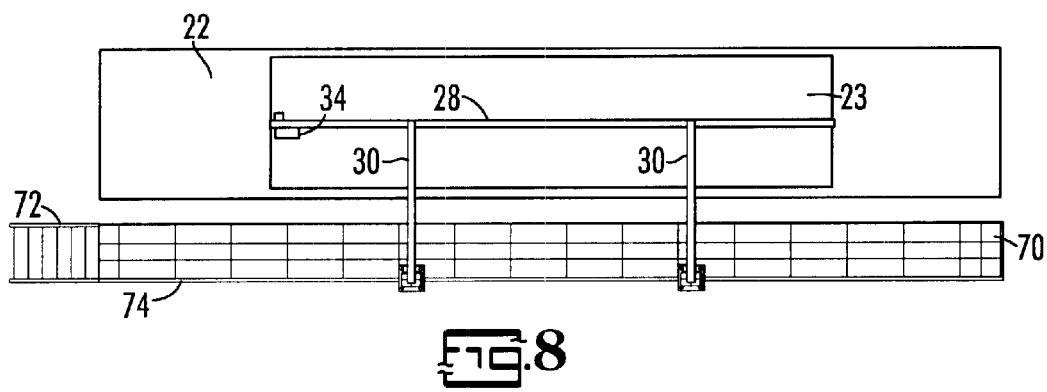
FIG. 8 is a top view of a workstation which includes a work platform.
Figure 9:
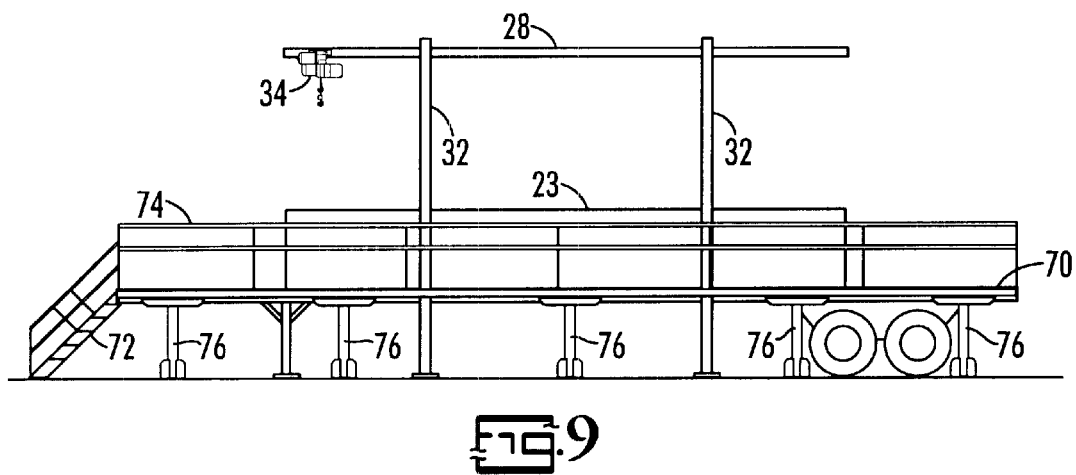
FIG. 9 is a side view of the work station shown in FIG. 8.
Figure 10:
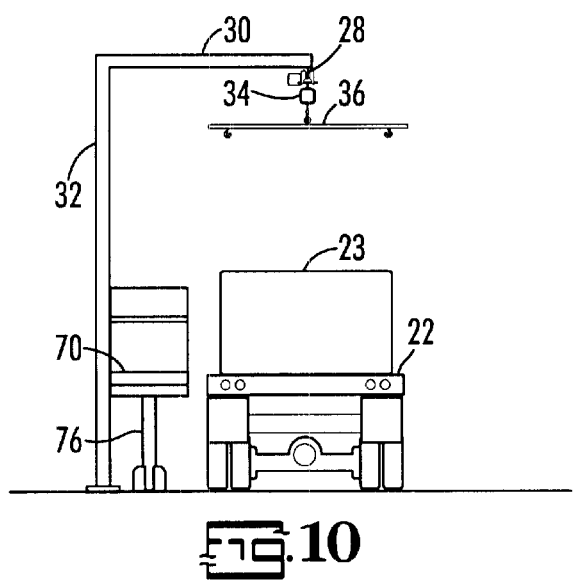
FIG. 10 is an end view of the work station shown in FIG. 9.

The work station shown in FIGS. 8, 9 and 10 includes a walkway or work platform 70 at one lateral side of the trailer 22. The work platform 70 is preferably as long as the trailer 22 and includes a ladder or stair case 72 at one end together with appropriate guard rails 74. There are no guard rails on the side of the walkway that is adjacent the trailer 22, thus permitting worker access to the trailer 22 and its payload 23. The work platform 70 is supported by legs 76 at the height of the floor of flatbed trailer and the platform 70 may be secured to the track support posts 32. The work platform 70 facilitates the tarping of a trailer by making it easier and quicker for workmen to assist in completing the load covering job including moving into position to fasten down the tarpaulin cover. Also, by standing on the work platform 70 the worker with the hoist controller 33 is in a better position to oversee the covering operation and to properly control the traveling hoist 34.

Figure 11:
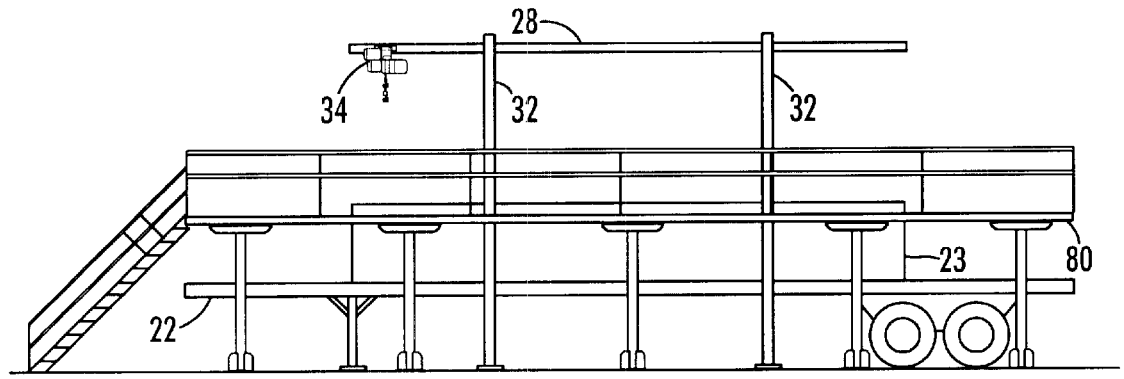
FIG. 11 is a side view of a workstation having an elevated work platform.
Figure 12:
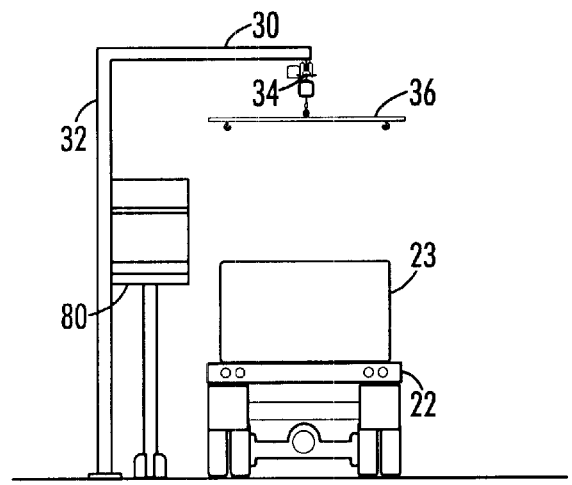
FIG. 12 is an end view of the work station shown in FIG. 11.

FIGS. 11 and 12 show a work station in which the work platform 80 is elevated to near the top of the payload 23 on the trailer 22. This construction is desirable for tarping payloads which have considerable height.

Figure 13:
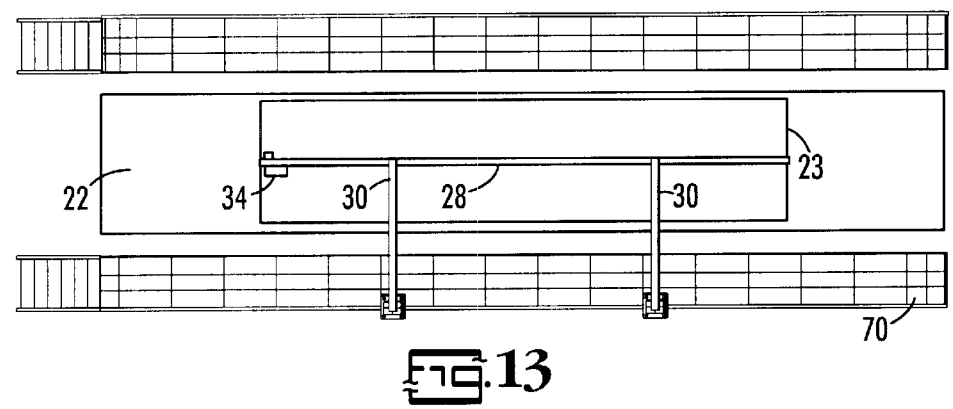
FIG. 13 is a top view of a workstation having work platforms at both lateral sides of the trailer.
Figure 14:
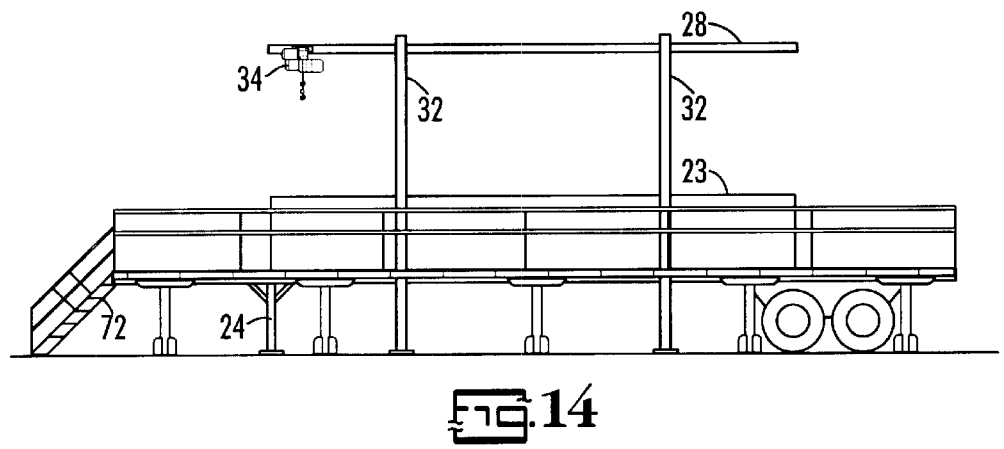
FIG. 14 is a side view of the work station shown in FIG. 13.
Figure 15:
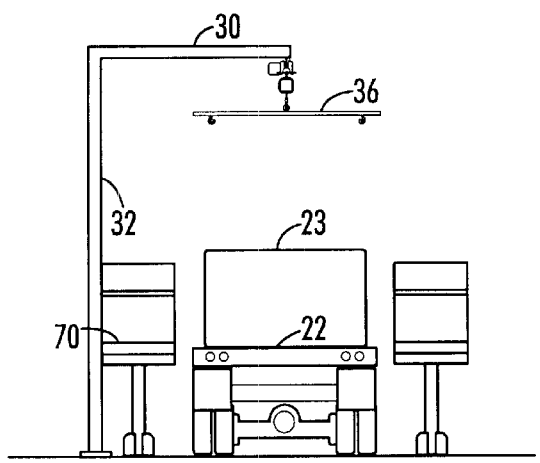
FIG. 15 is an end view of the work station shown in FIG. 14.

FIGS. 13, 14 and 15 illustrate a work station having a first work platform 70 on one lateral side of the trailer 22 and a second work platform 84 at the opposite lateral side of the trailer 22 being tarped. This allows additional workmen to assist in the tarpaulin cover applying operation thereby speeding up the tarping procedure. Also, an irregular configuration of the payload may make it desirable to have workman at both sides of the trailer and in positions to properly place a tarpaulin cover on the payload.

Figure 16:
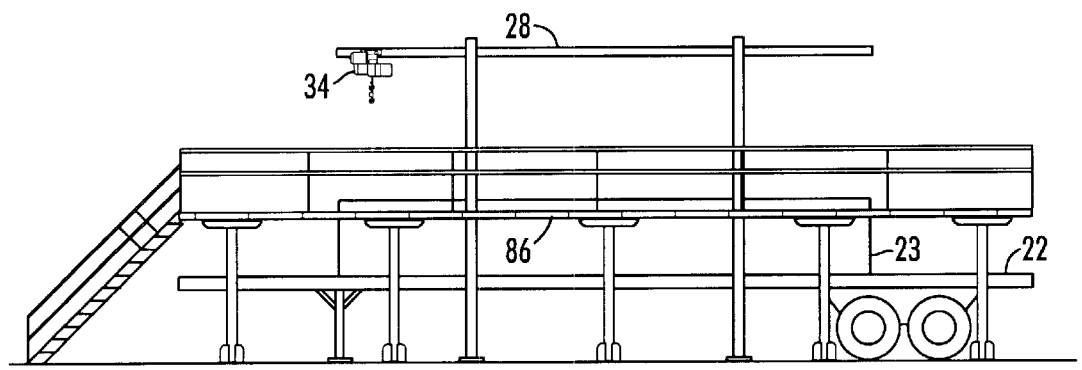
FIG. 16 is a side view of a work station having an elevated work platform at each of the lateral sides of the trailer being tarped.
Figure 17:
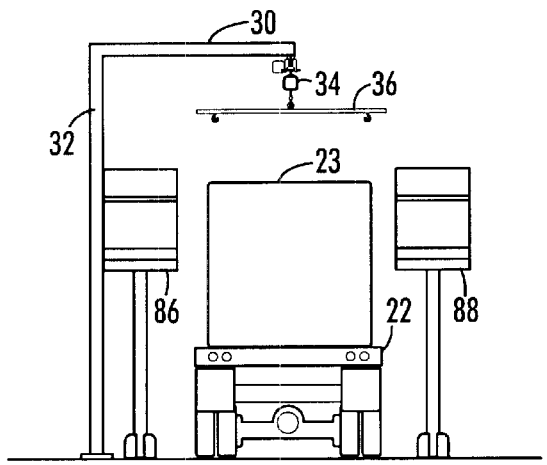
FIG. 17 is an end view of the work station shown in FIG. 16.

FIGS. 16 and 17 show a work station with elevated work platforms 86, 88 at opposite sides of the trailer being tarped. Workmen on these elevated platforms can prevent the tarpaulin being dragged across payload items having sharp corners or edges. This work station design is desirable for high payloads or payloads having tarpaulin covers applied only to their tops.

Figure 18:
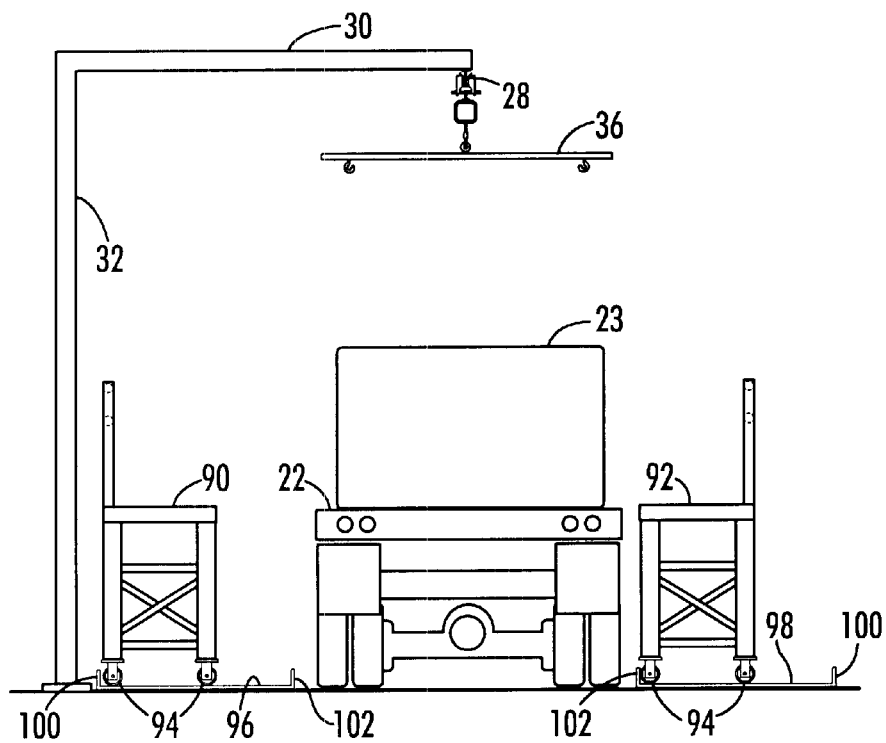
FIG. 18 is an end view of a work station having work platforms at opposite lateral sides of the trailer which are supported on wheels permitting lateral movement of the platforms relative to the trailer.
Figure 19:
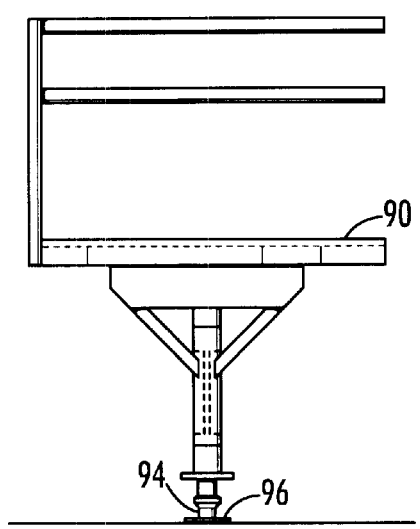
FIG. 19 is a partial side view of one of the wheeled platforms shown in FIG. 18.

FIGS. 18 and 19 illustrate a work station having work platforms 90, 92 at opposite sides of the trailer 22 being tarped, which are mounted on rollers or wheels 94 supported on laterally extending tracks 96, 98 having stops or abutments 100 at their opposite ends. By rolling the platforms 90, 92 away from one another the truck operator is given additional room to drive the truck and trailer into the tarping station and each platform can then be rolled into the desired position adjacent the trailer for the tarping of the trailer. This construction prevents accidental damage to the work station by the truck or trailer when moved into the tarping station. Also, the work platform 90 can be rolled away from the tractor/trailer if the truck driver needs to inspect the tires or other parts of the trailer prior to moving the trailer out of the work station.

In order to avoid unnecessary repetition, the controller 33 and its electric cable 35 are not illustrated in FIGS. 8–18;

however, it is to be understood that these components are present in an operative construction of this invention.

What is claimed is:

1. A work station for tarping a highway trailer with a tarpaulin cover, comprising:
    an overhead track structure including
        a pair of upright posts spaced from one another in the longitudinal direction of the position of a trailer when said trailer is being tarped,
        an arm extending horizontally from the top of each of said upright posts
        to points aligned longitudinally directly above said trailer position,
        a track secured to said points on said arms,
    a traveling hoist including
        a carriage with wheels engaging said track,
        a winch mounted on said carriage including a hoist line with a tarpaulin hanger adapted for connection to one end of a tarpaulin cover,
        an electric motor mounted on said carriage and driving said winch and
        an electric motor driving mounted on said carriage and driving said wheels of said carriage,
    a manually operated controller operatively associated with said motors permitting an operator to selectively cause said the winch to raise and lower said hoist line and to selectively cause the hoist carriage to move along said track, and
    a work platform for workmen including a walkway at approximately the height of said trailer, said work platform being parallel to said track and disposed at one lateral side of said position of said trailer when the latter is being tarped at said work station.

2. The work station of claim 1 and further comprising a second work platform at the other lateral side of said position of said trailer.

3. The work station of claim 1 wherein said work platform is mounted on rollers permitting said work platform to be moved laterally relative to said trailer position.

4. A work station for tarping a highway trailer with a tarpaulin cover, comprising:
    an overhead track structure including
        a pair of upright posts spaced from one another in the longitudinal direction of the position of a trailer when said trailer is being tarped,
        an arm extending horizontally from the top of each of said upright posts
        to points aligned longitudinally directly above said trailer position,
        a track secured to said points on said arms,
    a traveling hoist including
        a carriage with wheels engaging said track,
        a winch mounted on said carriage including a hoist line with a tarpaulin hanger adapted for connection to one end of a tarpaulin cover,
        an electric motor mounted on said carriage and driving said winch and
        an electric motor driving mounted on said carriage and driving said wheels of said carriage,
    a manually operated controller operatively associated with said motors permitting an operator to selectively cause said the winch to raise and lower said hoist line and to selectively cause the hoist carriage to move along said track, and
    a work platform disposed alongside said position of said trailer when the latter is being tarped, said work platform being elevated above the level of said flatbed trailer being tarped.

5. The work station of claim 4 and further comprising a work platform at the opposite side of said position of said trailer being tarped, said second work platform being elevated above the level of said flatbed trailer being tarped.

6. The work station of claim 4 wherein said work platform is mounted on rollers permitting said work platform to be moved laterally relative to said trailer position.

7. A work station for tarping a highway trailer with a tarpaulin cover, comprising
    an overhead track extending longitudinally above the position of a highway trailer positioned for tarping,
    support structure for said track on at least one lateral side of said position permitting straight line movement of said trailer into and out of said position,
    said track being disposed at a height permitting movement of trucks and trailers thereunder with legally permissible load heights,
    a traveling hoist including
        a carriage having wheels engaging said track whereby said carriage is supported by said track,
        a winch mounted on said carriage including a retractable hoist line with a tarpaulin hanger adapted for connection to one end of a tarpaulin cover and
        an electric motor mounted on said carriage and drivingly connected to said wheels of said carriage,
    a manually operated controller connected to said motors permitting an operator to selectively cause said winch to raise and lower said hoist line and to selectively cause said hoist carriage to move back and forth on said track and
    a work platform for workmen including a walkway at approximately the height of said trailer, said work platform being parallel to said track and disposed at one lateral side of said position of said trailer when the latter is being tarped at said work station.

8. The work station of claim 7 and further comprising a second work platform at the other lateral side of said trailer.

9. The work station of claim 7 wherein said work platform is mounted on rollers permitting said work platform to be moved laterally relative to said trailer position.

* * * * *